US006999000B2

(12) United States Patent
Campbell et al.

(10) Patent No.: US 6,999,000 B2
(45) Date of Patent: Feb. 14, 2006

(54) TRANSPONDER-BASED MICROWAVE TELEMETRY APPARATUS

(75) Inventors: Richard Lynn Campbell, Portland, OR (US); Douglas Bruce Brumm, Hastings, MI (US); Glen Barna, Houghton, MI (US); Carl Anderson, Houghton, MI (US)

(73) Assignee: The Board of Control of Michigan Technological University, Houghton, MI (US)

( * ) Notice: Subject to any disclaimer, the term of this patent is extended or adjusted under 35 U.S.C. 154(b) by 514 days.

(21) Appl. No.: 10/207,489

(22) Filed: Jul. 29, 2002

(65) Prior Publication Data

US 2004/0017299 A1 Jan. 29, 2004

(51) Int. Cl.
*B60R 25/10* (2006.01)
*G08C 19/16* (2006.01)
*G08C 15/04* (2006.01)
*G08B 21/00* (2006.01)

(52) U.S. Cl. ............ 340/870.01; 340/455; 340/426.16; 340/870.17

(58) Field of Classification Search .............................. 340/870.01–870.17, 455, 426.16
See application file for complete search history.

(56) References Cited

U.S. PATENT DOCUMENTS 3,806,905 A * 4/1974 Strenglein ................... 340/505
4,075,632 A * 2/1978 Baldwin et al. .............. 342/51
4,520,660 A * 6/1985 Hitchcock .................... 73/120
4,749,992 A * 6/1988 Fitzemeyer et al. ... 340/870.02
4,908,629 A * 3/1990 Apsell et al. ............... 342/457
5,106,202 A 4/1992 Anderson et al.
5,550,537 A * 8/1996 Perdue .................. 340/870.01
5,555,457 A * 9/1996 Campbell et al. ...... 340/870.17
5,562,787 A * 10/1996 Koch et al. ................... 156/64
5,573,611 A * 11/1996 Koch et al. ............. 152/152.1
5,731,754 A * 3/1998 Lee et al. ................... 340/447
5,825,302 A * 10/1998 Stafford ................ 340/870.01
6,278,363 B1 * 8/2001 Bezek et al. ................ 340/442
6,318,068 B1 * 11/2001 Shaw ......................... 60/39.6
6,476,712 B1 * 11/2002 Achterholt .................. 340/447

FOREIGN PATENT DOCUMENTS

DE 100 06 235 C1 8/2001
DE 100 18 621 A1 10/2001
WO WO 93/15417 8/1993
WO WO 97/45277 12/1997

* cited by examiner

*Primary Examiner*—Michael Horabik
*Assistant Examiner*—Kimberly Jenkins
(74) *Attorney, Agent, or Firm*—Bliss McGlynn, P.C.

(57) ABSTRACT

A transponder-based microwave telemetry apparatus for moving machinery includes a microwave transmitter disposed outside the moving machinery to fill a chamber of the moving machinery with microwave energy. The transponder-based microwave telemetry apparatus also includes a transponder disposed inside the moving machinery for measuring a sensed condition of a part of the moving machinery and providing a modulated microwave signal that contains information on the sensed condition. The transponder-based microwave telemetry apparatus further includes a receiver disposed outside the moving machinery to separate modulated and continuous-wave signal components of the signal and extracts information from the modulated component.

18 Claims, 5 Drawing Sheets

TRANSPONDER-BASED MICROWAVE TELEMETRY APPARATUS

BACKGROUND OF THE INVENTION

1. Field of the Invention

The present invention relates generally to microwave telemetry and, more specifically, to a transponder-based microwave telemetry apparatus for sensing conditions in or on machinery.

2. Description of the Related Art

It is known to sense conditions in machinery such as an internal combustion engine or a torque converter for a motor vehicle. Typically, the engine includes an engine block having a plurality of cylinders and reciprocating pistons disposed in the cylinders. The pistons are reciprocated by a crankshaft via connecting rods.

It is desirable to monitor or sense temperature, pressure, strain, acceleration, proximity, velocity, etc. inside machinery such as the internal combustion engine. However, it becomes difficult to get the sensed conditions off of moving parts and out of enclosed areas of the engine as a reliable, usable signal and in a cost effective manner. For example, it has been proposed to bring signals out of the engine using slip rings and/or mechanical linkages. These have a number of inherent disadvantages. Slip rings are susceptible to electrical noise, which affects reliability. Mechanical linkages are difficult to install, requiring extensive modifications to the engine, and are limited as to the speeds to which they can be exposed, i.e. engine R.P.M.

It is also known to provide a microwave telemetry apparatus for sensing conditions. An example of such an apparatus is disclosed in U.S. Pat. No. 5,555,457 to Campbell et al., the disclosure of which is hereby incorporated by reference. In that patent, an apparatus includes a sensor to sense the interior pressure of a torque converter and generate an electrical signal representative of that pressure. The apparatus also includes a microwave transmitter located within the torque converter, which converts the electrical signal to microwave energy, which is radiated into the interior of the torque converter. The apparatus further includes a stationary receiving microwave antenna exposed to the interior of the torque converter to receive the microwaves and transmit an electrical signal corresponding the microwave energy to a remote receiving device external of the torque converter.

A number of techniques are currently used to measure the temperature of a piston in an internal combustion engine. For example, infrared telemetry transmits information "line-of-sight" as pulses of infrared light from the paths to a stationary photodetector disposed in the crankcase of the engine. Another example is the contact point method, which maintains continuous sliding electrical contact between the piston and the stationary contact on the engine block. Yet another example is the induction coil method that transmits information only at the top or bottom of piston travel when a moving secondary coil on the system is coupled with a stationary primary coil on the engine. Still another example is an "L-Link" or "Grasshopper" linkage, which is designed to support the information carrying wire harness from the piston to outside the engine. A further example is radio frequency telemetry, which transmits information from the piston by way of a radio transmitter mounted on the piston, which transmits waves to an antenna in the crankcase of the engine. Yet a further example is "templugs" which are small threaded plugs made of alloy steel with a special heat treatment. After exposure to elevated temperatures, the plugs will undergo an annealing process and the hardness of the plugs is measured to determine what temperature they were exposed.

SUMMARY OF THE INVENTION

It is, therefore, one object of the present invention to provide a transponder-based microwave telemetry apparatus for sensing conditions in or on moving machinery.

It is another object of the present invention to provide a transponder-based microwave telemetry apparatus for sensing temperature, pressure, strain, acceleration, proximity, velocity, etc., in or on moving machinery such as a piston in an internal combustion engine, or a blade element in a torque converter.

To achieve the foregoing objects, the present invention is a transponder-based microwave telemetry apparatus for moving machinery. The transponder-based microwave telemetry apparatus includes a microwave transmitter disposed outside the moving machinery to fill a chamber of the moving machinery with microwave energy. The transponder-based microwave telemetry apparatus also includes a transponder disposed inside the moving machinery for measuring a sensed condition of a part of the moving machinery and providing a modulated microwave signal that contains information on the sensed condition. The transponder-based microwave telemetry apparatus further includes a receiver disposed outside the moving machinery to separate modulated and continuous-wave signal components of the signal and extract information from the modulated component.

One advantage of the present invention is that a transponder-based microwave telemetry apparatus is provided for moving machinery such as an internal combustion engine. Another advantage of the present invention is that the transponder-based microwave telemetry apparatus has a smaller package size, no "line-of-sight" constraint, which allows more freedom in the placement of the transmitter and receiver. Yet another advantage of the present invention is that the transponder-based microwave telemetry apparatus uses an electromagnetic frequency which is relatively unaffected by any other interference in the engine and is actually enhanced by reflection within the confines of a crankcase of an internal combustion engine. Still another advantage of the present invention is that the transponder-based microwave telemetry apparatus has low power consumption, has no wires, is easy to install, supports continuous data transmissions, and experiences very little attenuation by engine oil in a crankcase of an internal combustion engine. A further advantage of the present invention is that the transponder-based microwave telemetry apparatus incorporates a transponder that shrinks the size of conventional transmitters and greatly reduces power consumption.

Other objects, features, and advantages of the present invention will be readily appreciated, as the same becomes better understood, after reading the subsequent description taken in conjunction with the accompanying drawings.

DESCRIPTION OF THE PREFERRED EMBODIMENTS

Figure 1:
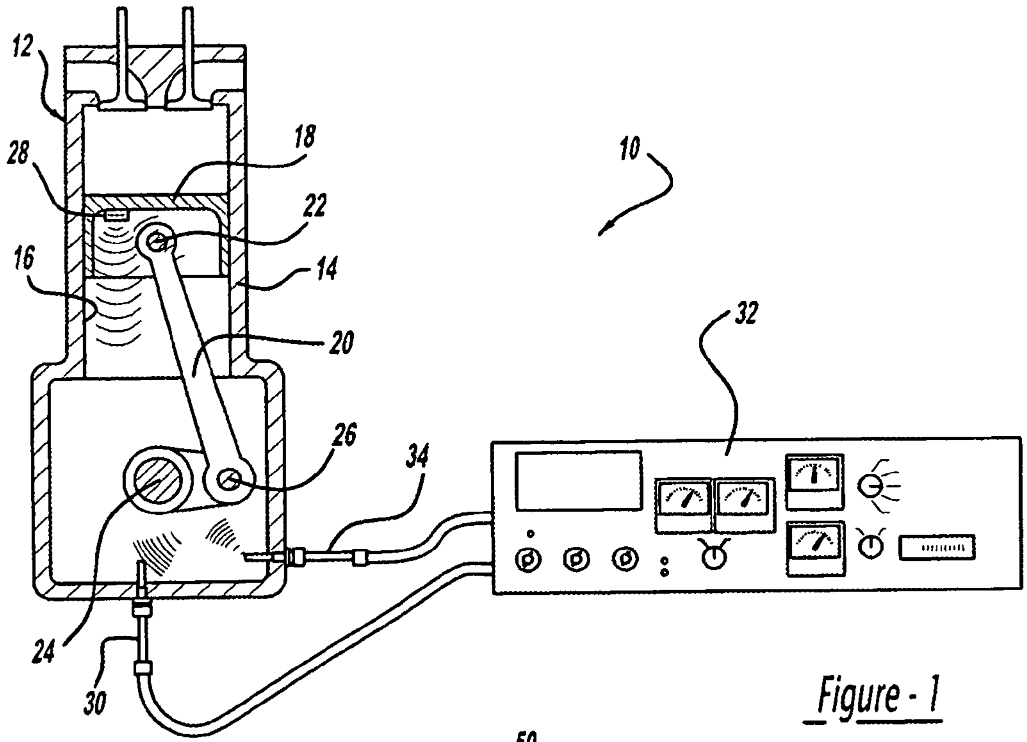
FIG. 1 is a fragmentary elevational view of a transponder-based microwave telemetry apparatus, according to the present invention, illustrated in operational relationship with moving machinery such as an internal combustion engine.

Referring to the drawings and in particular FIG. 1, one embodiment of a transponder-based microwave telemetry apparatus 10, according to the present invention, is illustrated in operational relationship with moving machinery such as an internal combustion engine, generally indicated at 12. The internal combustion engine 12 includes an engine block or crankcase 14 having at least one cylinder 16. The internal combustion engine 12 also includes a piston 18 disposed and movable in the cylinder 16. The internal combustion engine 12 includes a connecting rod 20 having one end pivotally connected to the piston 18 by suitable means such as a pin 22. The internal combustion engine 12 also includes a rotatable crankshaft 24 connected to the end of the connecting rod 20 by suitable means such as a pin 26. It should be appreciated that the internal combustion engine 12 is conventional and known in the art.

The transponder-based microwave telemetry apparatus 10 includes a transponder 28 connected to the piston 18 or connecting rod 20 by suitable means. The transponder 28 measures a sensed condition such as temperature of the piston 18 in the internal combustion engine 12 and modulates the signal received from a transceiver 32 to be described to produce a signal that contains information on the sensed condition by varying the scattering efficiency of the transponder antenna. It should be appreciated that the sensed condition may be temperature, pressure, strain, acceleration, proximity, velocity, etc. It should also be appreciated that, although an embodiment illustrating the internal combustion engine 12 is shown, the transponder-based microwave telemetry apparatus 10 may be used for sensing conditions in or on other moving machinery such as a torque converter. It should further be appreciated that the transponder 28 may be mounted anywhere that there is room on a given machine part and packaged to withstand very high g loading, shock, vibration, and temperature.

The transponder-based microwave telemetry apparatus 10 also includes a receiving antenna 30 having one end extending through the crankcase 14 for receiving the modulated microwave signal from the transponder 28. The transponder-based microwave telemetry apparatus 10 includes a transceiver 32 connected to the other end of the receiving antenna 30. The transceiver 32 is of a microwave type for receiving the modulated signal and for transmitting microwave energy. The transponder-based microwave telemetry apparatus 10 also includes a transmitting antenna 34 having one end connected to the transceiver 32 and another end extending through the crankcase 14 to fill the crankcase 14 of the internal combustion engine 12 with microwave energy from the transceiver 32. It should be appreciated that temperature sensitive thermistors (not shown) in the piston 18 are used to sense temperature of the piston 18 and are electrically connected by suitable means such as wires (not shown) to the transponder 28.

Figure 2B:
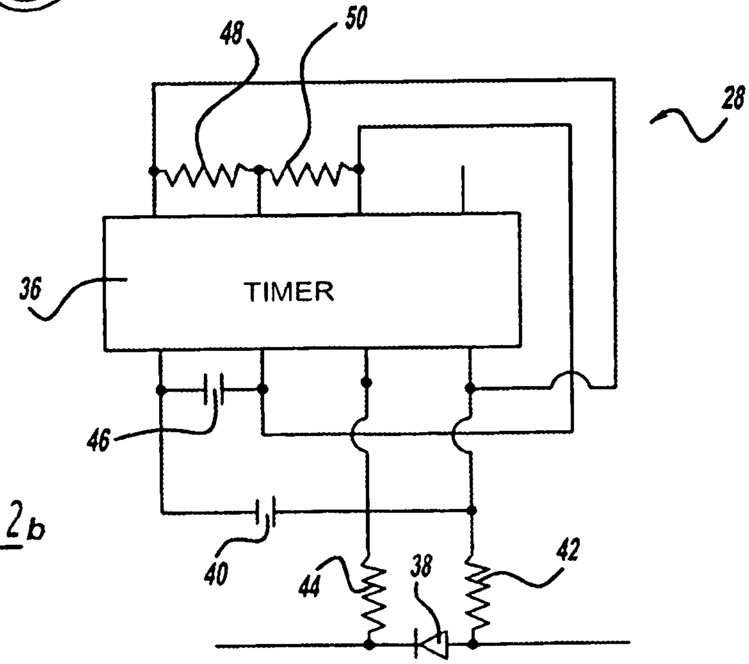
FIG. 2B is a circuit schematic of a transponder of the transponder-based microwave telemetry apparatus of FIG. 1.
Figure 2A:
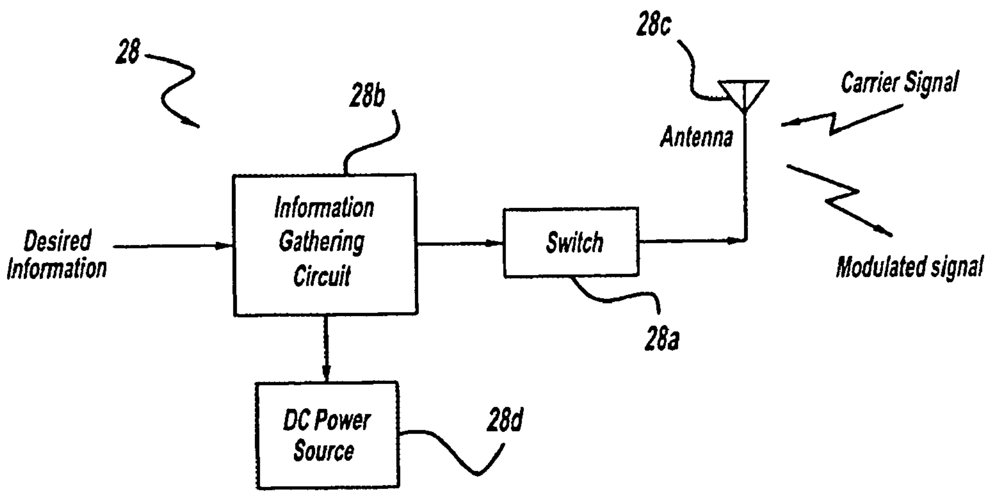
FIG. 2A is a block diagram of a transponder of the transponder-based microwave telemetry apparatus of FIG. 1.

Referring to FIG. 2A, the transponder 28 has four specific parts. The transponder 28 includes a switch 28*a*, an information gathering circuit 28*b*, an antenna 28*c*, and a power source 28*d* such as direct or inductive current. The switch 28*a* turns the antenna 28*c* ON and OFF at a frequency determined by the information gathering circuit 28*b*. It should be appreciated that the ON and OFF action of the antenna amplitude modulates the scattered component of the incoming microwave energy or carrier from the transceiver 32. It should be appreciated that this is accomplished by switching the antenna between resonant (with high signal output) and nonresonant (with a low signal output) conditions.

Referring to FIG. 2B, a circuit schematic of the transponder 28 is illustrated. The transponder 28 includes a timer chip 36, for example a LM555CN type or AD537 Voltage-To-Frequency Converter, and a diode 38, for example, a HP5082-2835 Schottky diode, which act as the switch 28*a*. The transponder 28 also includes the power source 28*d* such as a nine-volt (9V) battery 40 and a first resistor 42 connected to one side of the diode 38. The first resistor 42 is also connected to the timer chip 36 and has a predetermined resistance such as one kilohm. The transponder 28 includes a second resistor 44 interconnecting the other side of the diode 38 and the timer chip 36. The second resistor 44 has a predetermined resistance such as one kilohm. The transponder 28 may include other electrical components electrically connected to the timer chip 36 such as a capacitor 46 having a predetermined capacitance of 10 nF, a third resistor 48 having a predetermined resistance such as 1 kilohm, and a fourth resistor 50 having a predetermined resistance such as 3.3 kilohm. It should be appreciated that these resistors and capacitor 46 determine the frequency at which the diode switches. It should also be appreciated that one of the resistors is a thermistor.

Figure 4:
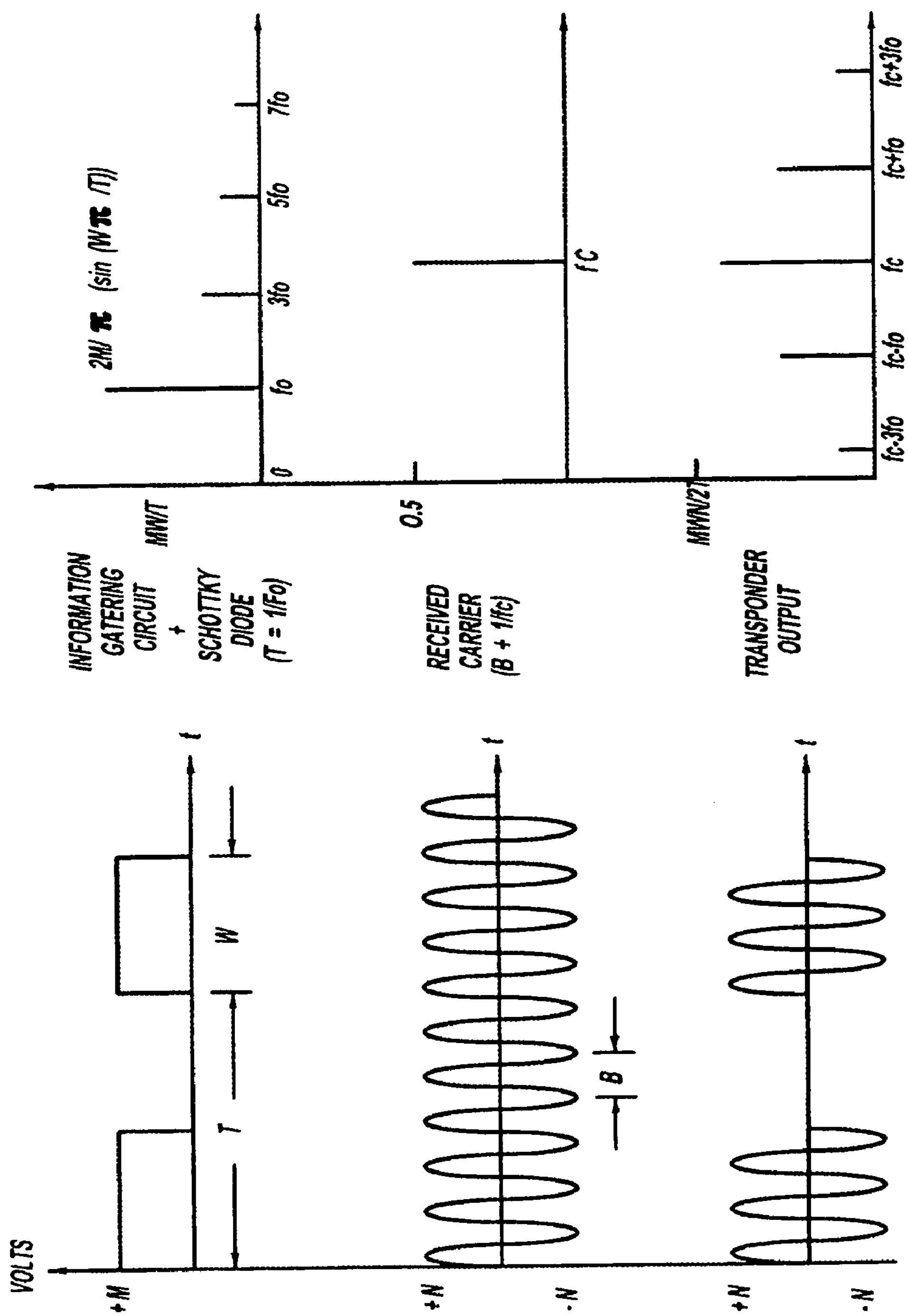
FIG. 4 is a graph of voltage versus time for the transponder-based microwave telemetry apparatus of FIG. 1.

The timer chip 36 is used as the information gathering circuit 28*b* that biases the diode 38 on and off at a rate determined by the sensed signal. The diode 38 requires a predetermined voltage such as 0.5 V before it fully conducts current. The diode amplitude modulates the incoming carrier from the transmitting antenna 34 and its wire leads reradiate the AM signal to the receiving antenna 30. The signal evolution in time and frequency domains for the transponder 28 is illustrated in FIG. 4. It should be appreciated that the timer chip 36 may be removed and the square wave output from the information gathering circuit connected to the diode 38. It should also be appreciated that this alternative permits a thermistor to be removed.

Figure 3:
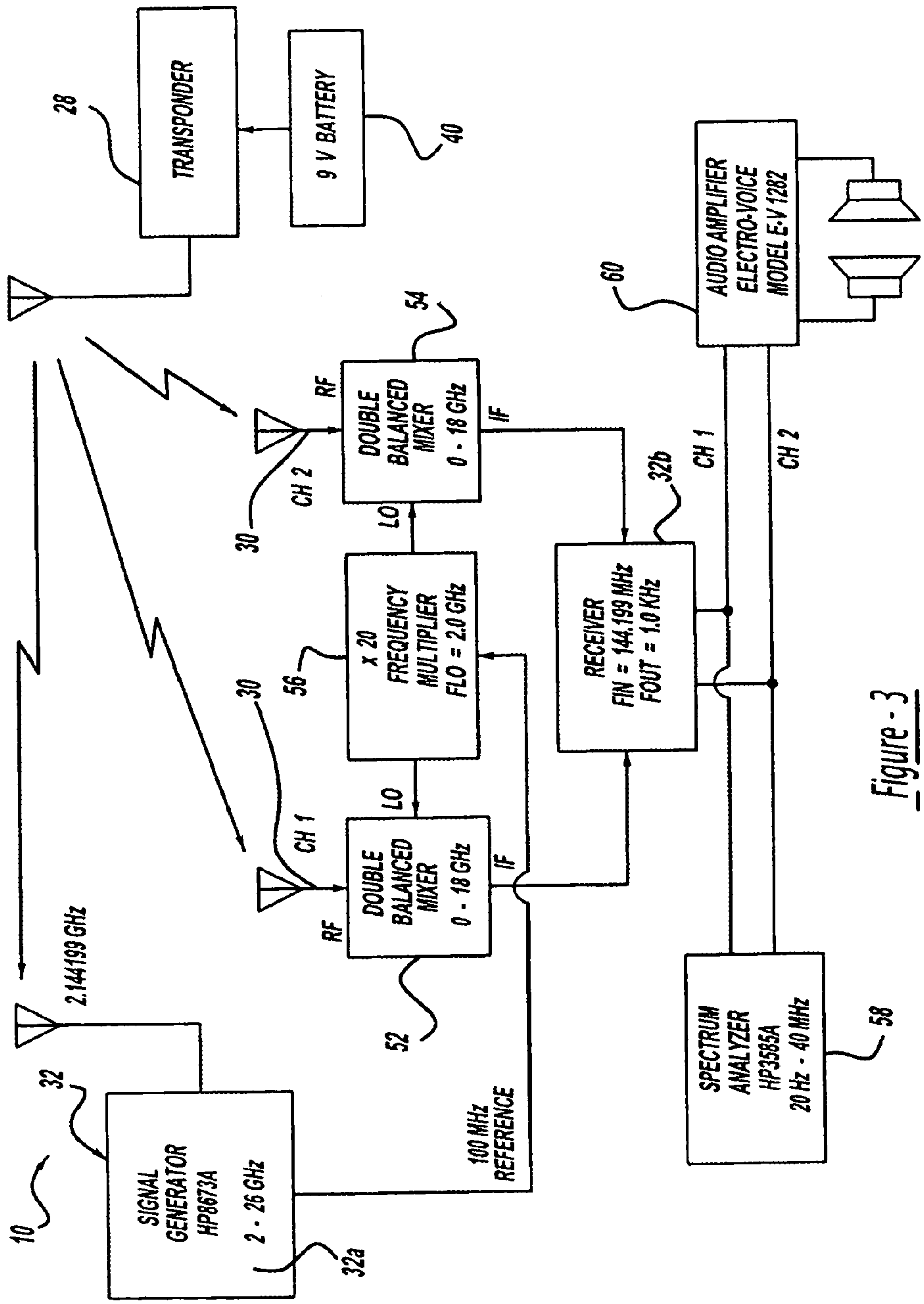
FIG. 3 is a block diagram of the transponder-based microwave telemetry apparatus of FIG. 1.

Referring to FIG. 3, the transponder-based microwave telemetry apparatus 10 is diagrammatically shown. The transceiver 32 has a signal generator 32*a* to transmit a signal of 2 to 26 gigahertz (GHz), preferably 2.144199 GHZ in the embodiment illustrated, and a receiver 32*b* to receive a signal of a frequency of about 144 megahertz (MHz) and to output a signal of about 1.0 KHz. The transceiver 32 may include a first double balanced mixer 52 for a first channel of the radio frequency signal and a second double balanced mixer 54 for a second channel of the radio frequency signal. The mixers 52 and 54 can receive a radio frequency signal of about 0 to about 18 GHz. The transceiver 32 may include a frequency multiplier 56 having an output to the mixers 52 and 54 and receiving an input from the signal generator 32*a*. The frequency multiplier 56 is a by twenty (20×) frequency multiplier having a FLO of 2.0 GHz. The receiver 32*b* receives the output from the mixers 52 and 54. A spectrum analyzer 58 and an audio amplifier 60 may be connected to the output of the receiver and to each other for analyzing the microwave telemetry apparatus 10. The spectrum analyzer 58 may be a HP3585A having a range of about 20 Hz to about 40 MHz and the audio amplifier 60 may be an electro-voice Model E-V 1282.

In operation, the signal generator of the transceiver 32 transmits a microwave frequency, sinusoidal carrier to the transponder 28. The transponder 28 modulates the carrier's amplitude with the square wave output of its timer chip 36. The AM signal was radiated to two receiving antennas 30 that were each connected to their own mixer 52,54. A local oscillator input for both mixers 52,54 was created by multiplying a stable radio frequency reference from the signal generator 32*a* of the transceiver 32. The mixers 52,54 subtracted the local oscillation frequency from the received signal frequency. The two resulting radio frequency signals were sent to a receiver 32*b* of the transceiver 32. The receiver essentially did the same frequency down conversion operation over again. This time its from the radio frequency range to the audio (20 Hz to 20 kHz) range. The only difference was that its local oscillator frequency was adjustable so that the resulting audio signals could be tuned to fall into the "frequency window" generated by a low pass filter. The presence of the AM signal was detected visually with the spectrum analyzer 58 and the audio amplifier 60.

Verification of the operation of the transponder 28 was successfully completed using the above. Presence of the AM signal's upper and lower side band odd harmonics were verified out to the $9^{th}$ harmonic. Adjusting the receiver's local oscillating frequency made the spectrum of the AM signal slide back and forth in the frequency domain. When one of the AM signal's spectrum components fell into the low pass filter's frequency window, a sharp spike could be observed on the spectrum analyzer 58 and an audible tone could be heard from the audio amplifier 60. When the transponder's 9V battery 40 was disconnected, the spike and tone would disappear except for the case when the carrier was tuned in. The spike and tone did not vanish in this case because the carrier was still being received directly from the signal generator. Turning the signal generator off verified this. It should be appreciated that the results of this test also showed that the transponder 28 is capable of using amplitude modulation by a radio frequency square wave pulse waveform.

Figure 5:
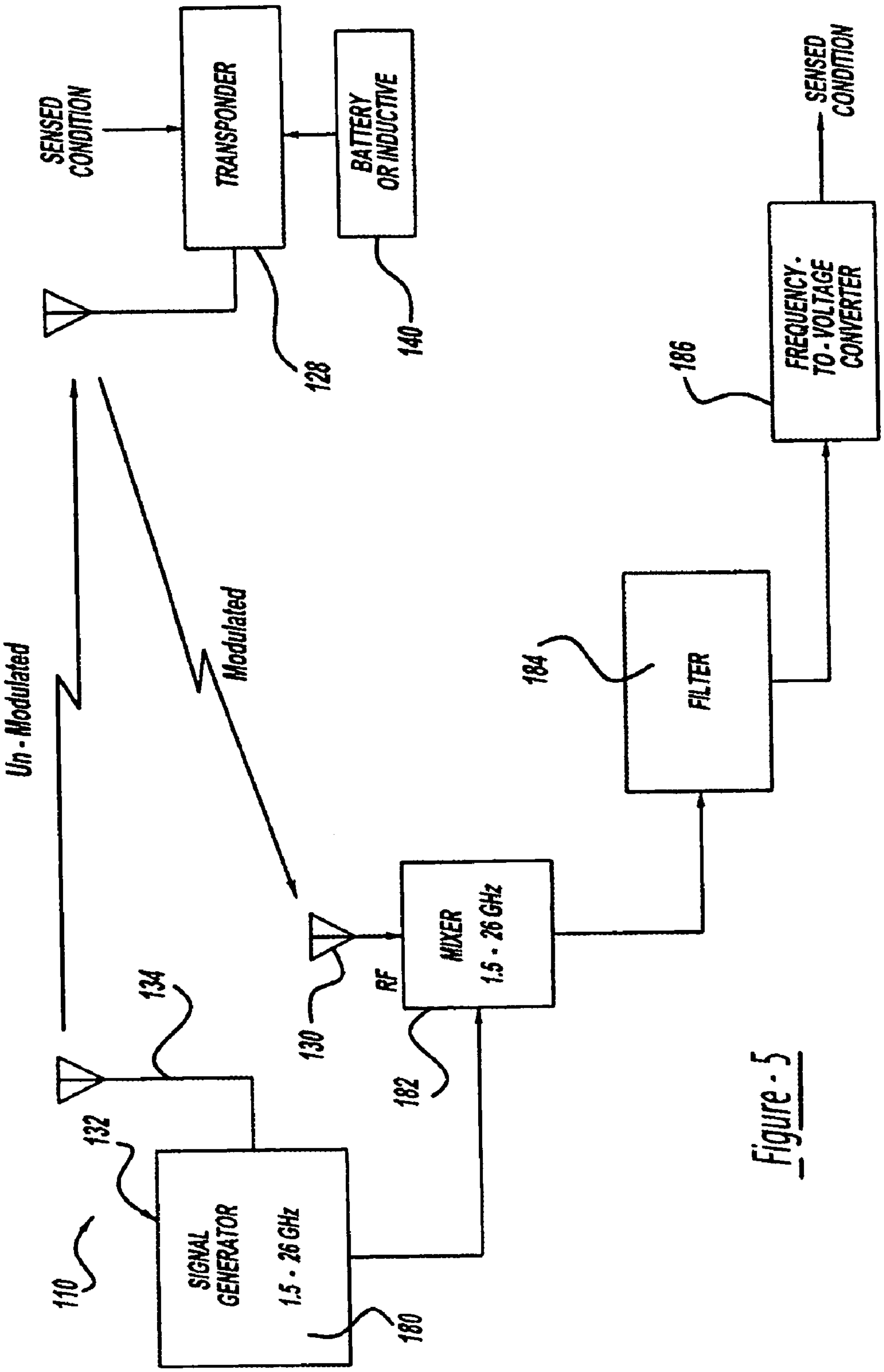
FIG. 5 is a block diagram of another embodiment, according to the present invention, of the transponder-based microwave telemetry apparatus of FIG. 1.

Referring to FIG. 5, another embodiment, according to the present invention, of the transponder-based microwave telemetry apparatus 10 diagrammatically shown. Like parts have like reference numerals increased by one hundred (100). In this embodiment of the transponder-based microwave telemetry apparatus 110, the transceiver 132 has a signal generator 180 to transmit a signal of 1.5 to 26 gigahertz (GHz), and a receiver to receive a signal of a frequency of about 144 megahertz (MHz) and to output a signal of about 1.0 KHz. The transceiver 132 may include a mixer 182 for the radio frequency signal. The mixer 180 can receive a radio frequency signal of about 1.5 to about 26 GHz. The transceiver 132 may include a filter 184 for receiving an input from the signal generator and for filtering the received signal. The transceiver 132 may include a frequency-to-voltage converter 186 having an output of the sensed condition and receiving an input from the filter 184. It should be appreciated that the operation of the transponder-based microwave telemetry apparatus 110 is similar to the transponder-based microwave telemetry apparatus 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A transponder-based microwave telemetry apparatus for moving machinery comprising:

a microwave transmitter disposed outside the moving machinery to fill a chamber of the moving machinery with microwave energy;

a transponder disposed inside the moving machinery for measuring a sensed condition of a part of the moving machinery, said transponder including an antenna and a switch electrically connected to said antenna, said switch turning said antenna ON and OFF to amplitude modulate incoming microwave energy, thereby providing a modulated microwave signal that contains information on the sensed condition; and a receiver disposed outside the moving machinery to separate modulated and continuous-wave signal components of the signal and extract information from the modulated component.

2. A transponder-based microwave telemetry apparatus as set forth in claim 1 wherein said switch comprises a diode.

3. A transponder-based microwave telemetry apparatus as set forth in claim 1 wherein said transponder includes an information gathering circuit electrically connected to said switch.

4. A transponder-based microwave telemetry apparatus as set forth in claim 3 wherein said information gathering circuit comprises either one of a timer and oscillator chip.

5. A transponder-based microwave telemetry apparatus as set forth in claim 1 wherein said antenna of said transponder transmits the modulated signal and receives the microwave energy.

6. A transponder-based microwave telemetry apparatus as set forth in claim 3 wherein said transponder includes a power source electrically connected to said information gathering circuit.

7. A transponder-based microwave telemetry apparatus as set forth in claim 1 including a transmitting antenna electrically connected to said transmitter and extending into the moving machinery.

8. A transponder-based microwave telemetry apparatus as set forth in claim 1 including a receiving antenna electrically connected to said receiver and extending into the moving machinery.

9. A transponder-based microwave telemetry apparatus as set forth in claim 1 wherein said transmitter and said receiver are a single unit.

10. A transponder-based microwave telemetry apparatus for an internal combustion engine comprising:

a transponder disposed inside the engine for measuring a sensed condition of a piston in the engine, said transponder including an antenna and a switch electrically connected to said antenna, said switch turning said antenna ON and OFF to amplitude modulate incoming microwave energy, thereby providing a modulated microwave signal that contains information on the sensed condition; and a transceiver disposed outside the engine to fill a crankcase of the engine with microwave energy and to separate modulated and continuous-wave signal components of the signal and extract information from the modulated component.

11. A transponder-based microwave telemetry apparatus as set forth in claim 10 wherein said switch comprises a diode.

12. A transponder-based microwave telemetry apparatus as set forth in claim 10 wherein said transponder includes an information gathering circuit electrically connected to said switch.

13. A transponder-based microwave telemetry apparatus as set forth in claim 12 wherein said information gathering circuit comprises either one of a timer and oscillator chip.

14. A transponder-based microwave telemetry apparatus as set forth in claim 10 wherein said of said transponder transmits the modulated signal and receives the microwave energy.

15. A transponder-based microwave telemetry apparatus as set forth in claim 12 wherein said transponder includes a direct current power source electrically connected to said information gathering circuit.

16. A transponder-based microwave telemetry apparatus as set forth in claim 10 including a transmitting antenna electrically connected to said transceiver and extending into the engine.

17. A transponder-based microwave telemetry apparatus as set forth in claim 10 including a receiving antenna electrically connected to said transceiver and extending into the engine.

18. A transponder-based microwave telemetry apparatus for an internal combustion engine comprising:

a transponder disposed inside the engine for measuring a sensed condition of a piston in the engine and providing a modulated microwave signal that contains information on the sensed condition, said transponder comprising a switch, an information gathering circuit, an antenna, and a power source, said switch turning said antenna ON and OFF at a frequency determined by said information gathering circuit to amplitude modulate incoming microwave energy; and a transceiver disposed outside the engine to fill a crankcase of the engine with the microwave energy and to separate modulated and continuous-wave signal components of the signal and extract information from the modulated component.

* * * * *

UNITED STATES PATENT AND TRADEMARK OFFICE

CERTIFICATE OF CORRECTION

PATENT NO. : 6,999,000 B2 
APPLICATION NO. : 10/207489
DATED : February 14, 2006
INVENTOR(S) : Richard Lynn Campbell et al.

It is certified that error appears in the above-identified patent and that said Letters Patent is hereby corrected as shown below:

Column 7, Claim 14, line 2, insert “antenna” after “said” (first occurrence).

Signed and Sealed this

Ninth Day of January, 2007

JON W. DUDAS
*Director of the United States Patent and Trademark Office*